United States Patent [19]

Gier et al.

[11] Patent Number: 5,798,640
[45] Date of Patent: Aug. 25, 1998

[54] PASSIVE MAGNETIC POSITION SENSOR

[75] Inventors: Lothar Gier, Bad Nauheim; Bernd Österle, Frankfurt; Rudolf Borchert, Bad Soden; Wolfgang Porth, Frankfurt; Sabine Stark, Königstein; Werner Wallrafen, Hofheim, all of Germany

[73] Assignee: VDO Adolf Schindling AG, Frankfurt, Germany

[21] Appl. No.: 649,141

[22] Filed: May 14, 1996

[30] Foreign Application Priority Data

Jul. 19, 1995 [DE] Germany .................. 195 26 254.9

[51] Int. Cl.⁶ .................. G01B 7/14; G01B 7/00; G01D 5/14; H01H 36/00
[52] U.S. Cl. .................. 324/207.24; 324/207.22; 33/708
[58] Field of Search .................. 324/207.24, 207.22, 324/207.11, 262; 33/708

[56] References Cited

U.S. PATENT DOCUMENTS 5,074,053  12/1991  West ................. 73/313

FOREIGN PATENT DOCUMENTS

| 0260091 | 3/1988 | European Pat. Off. |
| 2011892 | 10/1970 | Germany |
| 9000737 | 4/1990 | Germany |
| 4309442 | 9/1994 | Germany |
| 4335004 | 4/1995 | Germany |

Primary Examiner—Walter E. Snow
Attorney, Agent, or Firm—Martin A. Farber

[57] ABSTRACT

A passive magnetic position sensor is constructed of an electrically non-conductive, non-magnetic substrate on which a resistance layer and a soft-magnetic, electrically conductive bending-beam structure are arranged. The resistance layer and bending-beam structure are arranged at a constant distance apart partially overlapping each other. The distance apart is selected so that, under the action of a magnet device conducted along the overlapping region of the bending-beam structure and resistance layer, contact is produced between resistance layer and soft-magnetic bending-beam structure. In order to provide a position sensor which permits a precise tapping of voltage, the electrically conductively developed resistance layer has along its longitudinal direction a meander-like structure adjoined by taps which have contact surfaces on the regions opposite the soft-magnetic bending-beam structure.

20 Claims, 4 Drawing Sheets

PASSIVE MAGNETIC POSITION SENSOR

FIELD AND BACKGROUND OF THE INVENTION

The present invention relates to a passive magnetic position sensor consisting of an electrically non-conductive, non-magnetic substrate on which a resistance layer and a soft-magnetic, electrically conductive bending-beam structure are arranged, the resistance layer and bending-beam structure being arranged at a constant distance apart partially one above the other. The distance apart is selected so that under the action of a magnet device guided along the overlapping region of bending-beam structure and resistance layer, contact is made between resistance layer and soft-magnetic bending-beam structure.

Position sensors are known in which, in order to set different resistance values, conductor-path and resistance-path are arranged one above the other, separated galvanically from each other, on a substrate. The conductive path is of comb shape and is connected on one side firmly to the substrate while its freely movable ends are opposite the resistance layer. A magnet device which is connected to the moving object is guided along the overlapping region of resistance path and conductive path. Depending on the position of the magnet device, the corresponding freely movable end of the conductive path is pulled onto the resistance path and electric contact thus established. The freely movable ends of the conductive path tap off different voltages from an electric circuit as a function of the place where the contact is made.

This has the disadvantage that the structure of the resistance path does not permit a precise adaptation of the voltage which drops over the resistance.

SUMMARY OF THE INVENTION

It is an object of the invention to provide a position sensor which permits a precise tapping off of the voltage, operates with little wear, and is structurally easy to produce.

In accordance with the invention, the resistance layer (2) is electrically conductive and has, in its longitudinal direction, a meandering structure (3) which is adjoined by the comb-like taps (4) which have contact surfaces (4a) on the regions lying opposite the soft-magnetic bending-beam structure.

The advantage of the invention resides in the improvement of the contactability. The comb-like development with adjoining contact surfaces of the resistance layer serves to increase the sensitivity and improve the local resolution.

According to a feature of the invention, the resistance layer (2) is applied by vaporization or sputtering onto the insulating substrate (1).

In this way, a substantially longer conductive path and thus larger resistance ranges, preferably between 500 Ω and 2 k Ω, can be produced on the same area.

In order to reduce the contact resistance, both the contact surfaces (4a) of the resistance layer (2) and the bending-beam structure which is freely movable on one side are coated with gold.

The insulating, non-magnetic substrate (1) which bears the resistance layer and the bending-beam structure consists either of a ceramic, glass or plastic plate or a glass-coated or insulation-coated metal plate.

In order to obtain a good electrical insulation of the resistance path and bending-beam structure outside of the contact region determined by the magnet device, the two of them are separated in space by a spacer.

The distance between resistance path and bending-beam structure is preferably produced by spacers which are contained in an adhesive and by which the resistance path or bending-beam structures are fastened to the insulating substrate. The spacers have in this connection an average size of 0.1–0.2 mm.

According to another embodiment, the soft-magnetic bending-beam structure (8) is gold-plated in the region of the contact surfaces (10).

Further according to the invention, the soft-magnetic bending-beam structure (8) is completely gold-plated.

Yet further, the resistance layer (2) and the bending-beam structure (8) are separated by spacers (7).

Moreover, the spacer (7) is a metal foil on which the soft-magnetic bending-beam structure (8) is fastened.

Still further, the spacer (7) is fastened by a temperature-resistant, gasification-poor adhesive both to the bending-beam structure (8) and also to the substrate (1).

According to another feature, the natural longitudinal curvature of the soft-magnetic bending-beam structure (8) can be used to obtain spacing.

Still further, the invention provides that the magnetic device is a permanent magnet (11).

Also by the invention, the permanent magnet (11) covers in its dimensions at least two bending-beams (9) of the soft-magnetic bending-beam structure (8).

Still further by the invention, the permanent magnet (11) is arranged movably on and spaced from the side of the resistance layer (2) facing away from the bending-beam structure (8).

Yet further with the invention, the resistance layer (2) and the bending-beam structure (8) are linear or arcuate.

Also the invention provides that the bending-beam structure (8) is supported on one or both sides.

Still further according to the invention, the insulating substrate (1) serves at the same time as housing wall which is closed by a housing cover (16).

BRIEF DESCRIPTION OF THE DRAWINGS

With the above and other objects and advantages in view, the present invention will become more clearly understood in connection with the detailed description of preferred embodiments, when considered with the accompanying drawings, of which.

DETAILED DESCRIPTION OF THE PREFERRED EMBODIMENTS

Figure 1:
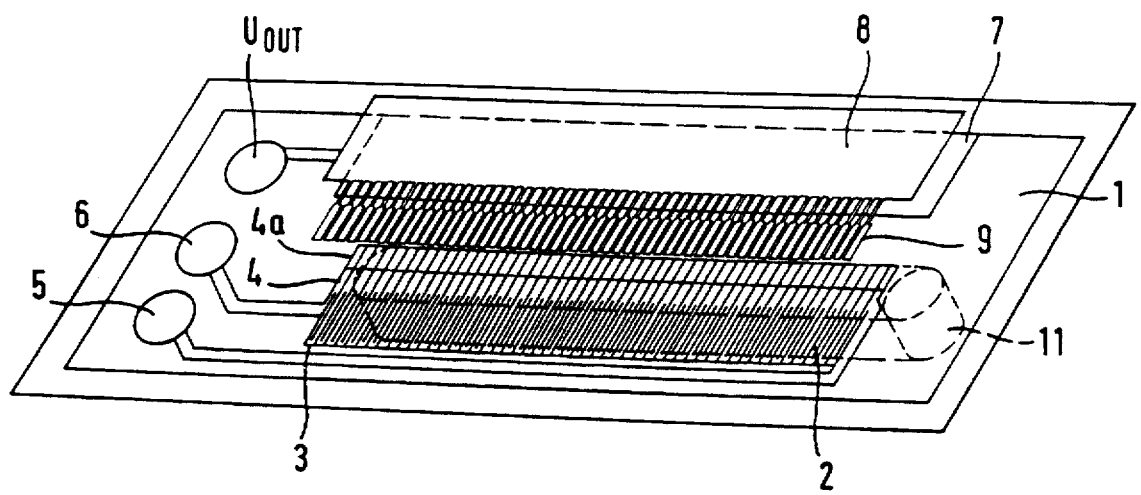
FIG. 1 is a view of the position sensor of the invention.

Identical features are provided with the same reference numerals in all figures.

FIG. 1 shows the construction of a linear passive magnetic position sensor based on a thin-film arrangement.

A non-magnetic, electrically non-conductive substrate 1 bears a metallic, low-ohmic and thus conductive resistance layer 2, which is developed in comb-shape.

As can be noted from FIG. 1, the resistance layer 2 has a region 3 which extends meandering between two electric terminals 5 and 6. Each meander is adjoined in each case by a tap 4 which is partially coated with gold and forms a closed contact surface 4a.

The resistance layer 2 is applied by sputtering or vaporization onto the insulating substrate 1 and adjusted to a small temperature coefficient (<100 ppm/K). The structuring of the resistance layer 2 is effected photolithographically by lacquer technique or etching or lift-off technique. The resistance value is determined by a suitable layout, by a corresponding film thickness or by the selection of the alloy. Typical conductive path widths in the case of the present meandering structure are 10 to 100 µm.

The meandering structure of the resistance layer 2 can be applied by vaporization or sputtering or be printed on a carbon or conductive-plastic film. Development as thick-film is also possible. A linearization or balancing of the precise film resistance is effected in this connection by laser, electronic beam, or other abrasive method.

Figure 2:
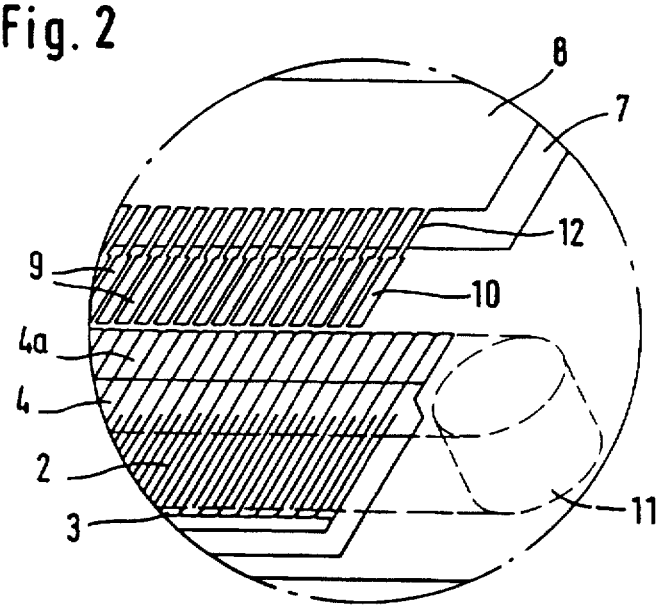
FIG. 2 is a showing of a portion of the position sensor of the invention.

On the substrate 1, parallel to the resistance layer 2, there is arranged a spacing foil 7 on which a comb-shaped bending-beam structure 8 in the form of a soft-magnetic foil is applied. In accordance with FIG. 2, the comb-shaped soft-magnetic foil 7 consists of bending beams 9 supported on one side. The bending beams 9 are developed with a waist 12 in their center region. The freely movable end 10 of the bending beam 9 which adjoins this waist 12 is coated galvanically with a thin film of gold in order to reduce the contact resistance. The formation of the waist 12 in each of the bending beams 9 leads to an optimizing of the magnet sensitivity.

The spacing foil 7 holds the freely movable ends 10 of the bending-beam structure 8 at a defined distance from the contact surfaces 4a of the resistance layer 2.

The spacing foil 7 is fastened by a temperature-stable, gasification-free adhesive both to the bending-beam structure 8 and to the insulating substrate 1. In order to produce an electric connection, the spacing foil 7 is developed metallically.

The spacing foil 7 can be dispensed with if the adhesive itself contains spacers, for instance broken glass of grain size, which assume the function of the spacer. The soft-magnetic foil 8 is itself electrically conductive. Furthermore, the natural longitudinal curvature of the bending-beam structure 8 can be utilized to obtain the spacing of the bending beams 9 from the contact surfaces 4a of the resistance layer 2.

The resistance layer 2 is connected via the terminals 5 and 6, preferably electrically, to ground and the operating voltage $U_B$. On the bending-beam structure 8 there is present the signal voltage $U_{OUT}$ which is variable in the range from 0 V to $U_B$ and represents the position of a permanent magnet 11.

Figure 5:
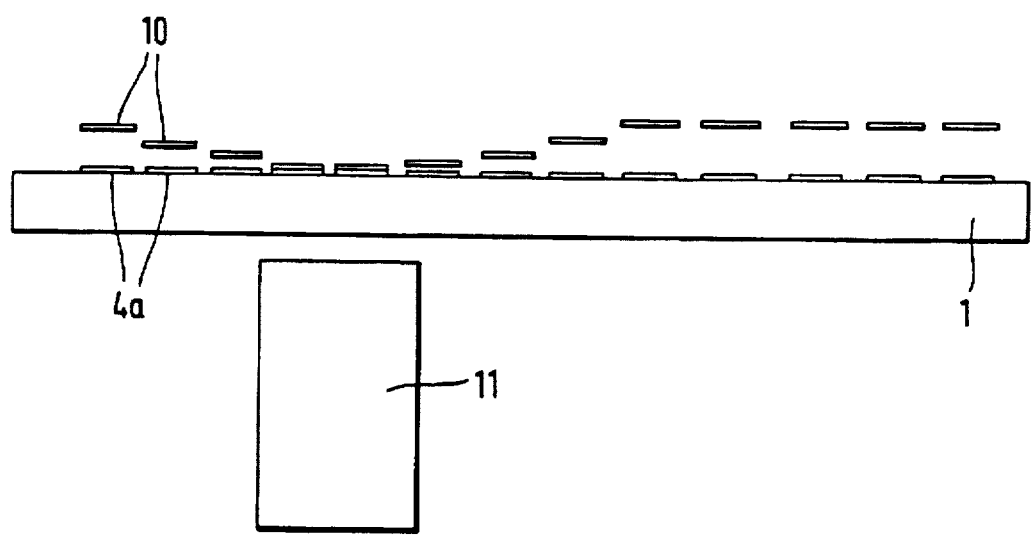
FIG. 5 is a diagrammatic showing of the principle of operation of the position sensor.

As can be noted from FIG. 5, the freely movable ends 10 of the bending beams 9 overlap the contact surfaces 4a of the resistance layer 2. Resistance path 2 and bending-beam structure 8 are so aligned that either the contact surfaces of both ends point in one direction or lie overlapping each other.

The permanent magnet 11, which is disposed movably on and at a distance from the side of the resistance layer 2 facing away from the soft-magnetic bending-beam structure 8, is moved in the region of the overlapping of the contact surfaces 4a of the resistance layer 2 by the freely movable ends 10 of the unilaterally supported bending beams 9.

The freely movable ends 10 of the bending beams 9 of the soft-magnetic foil 8 are pulled by the magnetic field of the permanent magnet 11 onto the contact surfaces 4a of the resistance layer 2 and contacted. Depending on the position in which the permanent magnet 11 produces a short circuit, a given tap of the resistance layer 2 is produced at this place by the terminal $U_{OUT}$.

The width of the permanent magnet 11 is such that several freely movable ends 10' of the bending-beam structure 8 which lie alongside of each other are contacted simultaneously with the corresponding contact surfaces 4a of the resistance layer 2 and thus act redundantly.

The resolution of the position sensor described is (100/n)%, in which n is the number of contact divisions (bending beams 9). In the middle region a resolution of (100/2n)% is obtained.

Figure 3:
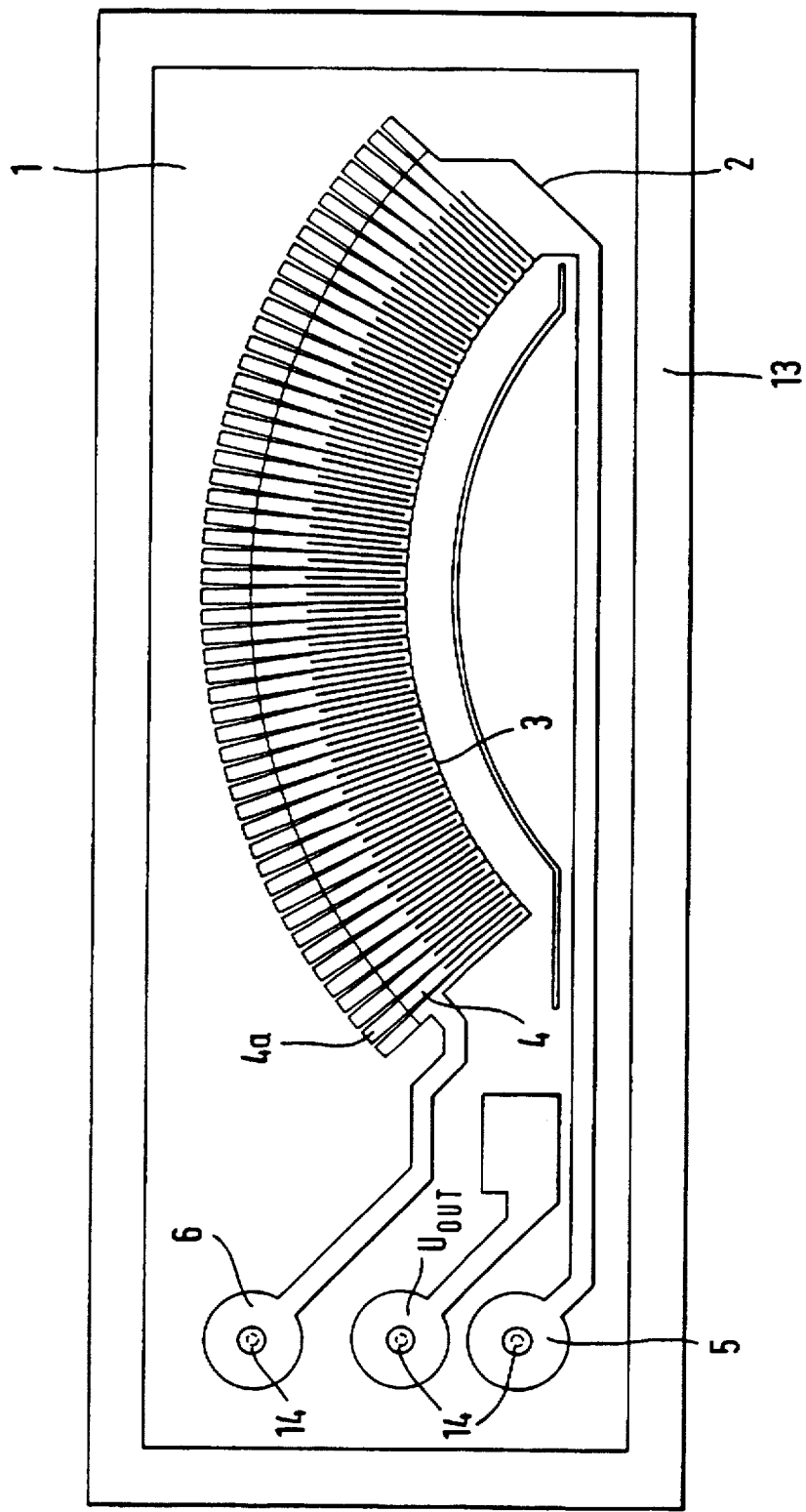
FIG. 3 shows a resistance layer in arcuate shape.
Figure 4:
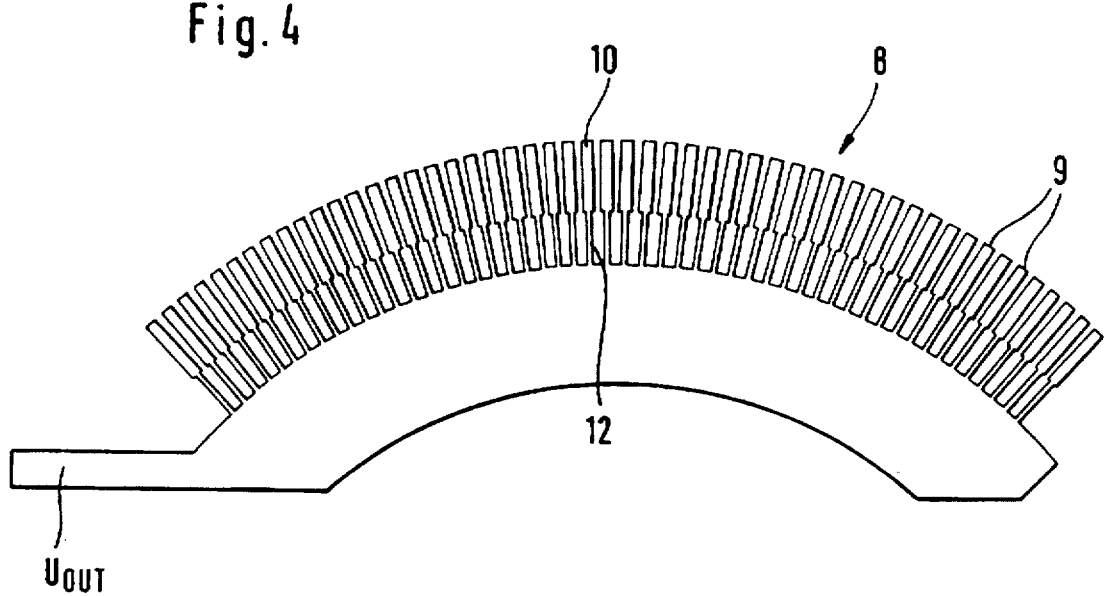
FIG. 4 shows a bending-beam structure in arcuate shape.

FIGS. 3 and 4 show an arcuate development of the resistance layer 2 and the bending-beam structure 8.

In order to improve the adaptation of the characteristic curve it is also possible to effect a development of the bending-beam structure 8 and/or of the meandering of the resistance layer 2 which is not equally divided.

Outside the measurement range of the position sensor, the resistance layer 2 as well as the bending-beam structure 8 each has an opposite contact region which is not shown (warning contact), upon the contacting of which by the permanent magnet the user of the position sensor is notified that the measurement range has been left.

The insulating substrate 1 which bears the resistance layer 2 and the soft-magnetic foil 8 consists of a ceramic plate. However, the use of glass or plastic supports or glass-coated or insulation-coated metal plates is also conceivable.

In another embodiment, the spacing foil 7 and the bending-beam structure 8 are pressed against the insulating substrate 1 by a clamped pressure plate, not shown.

The insulating substrate 1, which bears the resistance layer 2, the spacing foil 7, as well as the soft-magnetic foil 8, serves at the same time as housing wall of the position sensor, which is closed by a housing cover 16.

Upon the use of a metallic housing cover 16, the cover can be completely tinplated for protection against corrosion and in order to improve the solderability. The material of the cover has in this connection a coefficient of expansion to which the material of the insulating substrate 1 is adapted.

The closed, pre-tinned housing of the position sensor is soldered.

Instead of the metallic housing cover 16, a solderable metallized ceramic cover can also be used.

A further possibility consists in bonding the housing cover 16 to the substrate by adhesive or a meltable foil.

Concurrently with application of the resistance layer 2 to the insulating substrate 1, a metal layer 3 is applied as surrounding edge onto the insulating substrate 1 for the encapsulating of the position sensor. In order to improve the solderability, the metal layer 15 is gold-plated.

Figure 6:
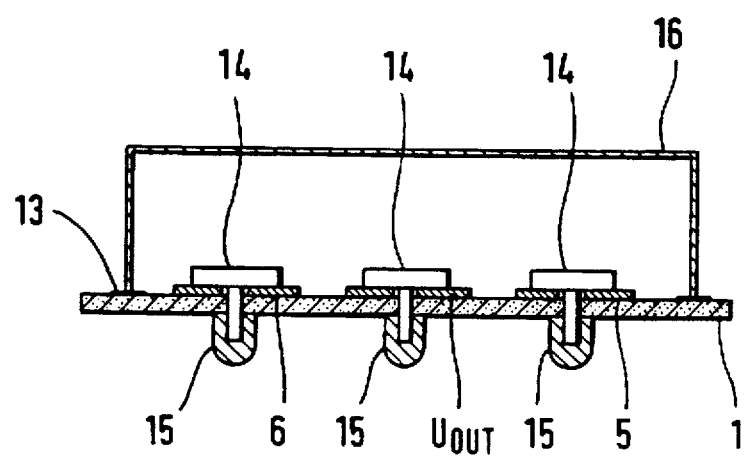
FIG. 6 is a diagrammatic showing of a cross section through the housing.

In order to produce the electric connections, pins 14 are passed through the insulating substrate 1 as shown in FIGS. 3 and 6 and are soldered or welded there hermetically tight, and thus in fluid-resistant manner, to the contact surfaces 5, 6 of the resistance layer 2 and $U_{OUT}$ of the bending-beam structure 8.

The pins 14 can be relieved from pressure by the sleeves 15 which are pushed over the pins from the outside of the housing.

By a suitable layout, the contact pins 14 can be developed as triple plug pins in the case of potentiometric wiring or double plug pins in the case of operation as position-dependent resistance.

The plug pins can, however, also be developed as 2- or 3-pole plug injection moldings for direct soldering into the position sensor.

We claim:

1. A passive magnetic position sensor comprising:
   a magnet device, an electrically non-conductive, non-magnetic substrate, and resistance layer disposed on the substrate, the magnet device being movable relative to the substrate;
   a soft-magnetic, electrically conductive bending-beam structure arranged spaced apart from the resistance layer with a spacing at a constant distance apart, the resistance layer and the bending-beam structure being arranged partially one above the other defining an overlapping region;
   wherein said bending-beam structure has a laminar body extending in a direction of movement of said magnet device, said bending-beam structure having multiple bending beams spaced apart from and parallel to each other, and each of said bending beams extending from said body in a second direction traverse to said direction of movement;
   the spacing distance provides that, under action of the magnet device during a guiding of the magnet device along the overlapping region of the bending-beam structure and resistance layer, contact is made between the resistance layer and the bending-beam structure; and
   the resistance layer is electrically conductive and has, in a longitudinal direction thereof, a meandering structure comprising taps which have contact surfaces on regions lying opposite the bending-beam structure, wherein each of said taps is elongated in a direction away from the meandering structure for electrically connecting the meandering structure with a respective one of said contact surfaces.

2. A position sensor according to claim 1, wherein said taps of said meandering structure have a comb-like configuration.

3. A position sensor according to claim 2, wherein said contact surfaces of the resistance layer are coated with gold.

4. A position sensor according to claim 1, wherein the insulating, non-magnetic substrate comprises an electrically insulating material made of a ceramic, glass or plastic plate.

5. A position sensor according to claim 1, wherein the insulating, non-magnetic substrate comprises an electrically insulating material consisting of a glass-coated or insulation-coated metal plate.

6. A position sensor according to claim 1, wherein said bending-beam structure has a gold-plated contact surface.

7. A position sensor according to claim 1, wherein said bending-beam structure is completely gold-plated.

8. A position sensor according to claim 1, further comprising a spacer, wherein said resistance layer and said bending-beam structure are separated by said spacer.

9. A position sensor according to claim 8, wherein the spacer comprises a metal foil on which said bending-beam structure is fastened.

10. A position sensor according to claim 9, wherein said spacer is fastened by a temperature-resistant, gasification-poor adhesive both to said bending-beam structure and also to said substrate.

11. A position sensor according to claim 9, wherein said bending-beam structure has a natural longitudinal curvature which is used to obtain said spacing.

12. A position sensor according to claim 1, wherein said magnetic device is a permanent magnet.

13. A position sensor according to claim 12, wherein said permanent magnet covers in its dimensions at least two of said multiple bending-beams of said bending-beam structure.

14. A position sensor according to claim 12, wherein
    said permanent magnet is spaced apart from a side of said resistance layer facing away from said bending-beam structure.

15. A position sensor according to claim 1, wherein
    said resistance layer and said bending-beam structure are linear.

16. A position sensor according to claim 1, wherein
    said resistance layer and said bending-beam structure are arcuate.

17. A position sensor according to claim 1, wherein
    said bending-beam structure is supported on at least one of its sides.

18. A position sensor according to claim 1, further comprising a housing cover enclosing said bending-beam structure, wherein
    said insulating substrate serves also as a housing wall which is closed by the housing cover.

19. A method of constructing a passive magnetic position sensor, the position sensor comprising:
    a magnet device, an electrically non-conductive, non-magnetic substrate, and a resistance layer disposed on the substrate, the magnet device being movable relative to the substrate;
    a soft-magnetic, electrically conductive bending-beam structure arranged spaced apart from the resistance layer with a spacing at a constant distance apart, the resistance layer and the bending-beam structure being arranged partially one above the other defining an overlapping region;
    wherein said bending-beam structure has a laminar body extending in a direction of movement of said magnet device, said bending-beam structure having multiple bending beams spaced apart from and parallel to each other, and each of said bending beams extending from said body in a second direction transverse to said direction of movement;
    the spacing distance provides that, under action of the magnet device during a guiding of the magnet device along the overlapping region of bending-beam structure and resistance layer, contact is made between the resistance layer and the bending-beam structure; and
    the resistance layer is electrically conductive and has, in a longitudinal direction thereof, a meandering structure comprising taps which have contact surfaces on regions lying opposite the bending-beam structure;
    wherein the method comprises steps of constructing the resistance layer by applying the resistance layer to the substrate by vaporization or sputtering onto the substrate, and extending the taps longitudinally in directions away from the meandering structure to provide contact surfaces distant from the meandering structure.

20. A sensor according to claim 1, wherein the meandering structure has an overall arcuate shape, and the taps extend radially outward from the meandering structure.

* * * * *